United States Patent
Batt et al.

(10) Patent No.: US 9,261,273 B2
(45) Date of Patent: Feb. 16, 2016

(54) PRESSURIZED POINT-OF-USE SUPERHEATED STEAM GENERATION APPARATUS AND METHOD

(75) Inventors: Jerod Batt, Cincinnati, OH (US); Jainagesh Sekhar, Cincinnati, OH (US); Michael Connelly, Cincinnati, OH (US)

(73) Assignee: MHI Health Devices, LLC, Cincinnati, OH (US)

( * ) Notice: Subject to any disclaimer, the term of this patent is extended or adjusted under 35 U.S.C. 154(b) by 0 days.

(21) Appl. No.: 13/984,350

(22) PCT Filed: Feb. 16, 2012

(86) PCT No.: PCT/US2012/025334
§ 371 (c)(1),
(2), (4) Date: Aug. 8, 2013

(87) PCT Pub. No.: WO2013/105990
PCT Pub. Date: Jul. 18, 2013

(65) Prior Publication Data
US 2013/0323139 A1    Dec. 5, 2013

Related U.S. Application Data

(60) Provisional application No. 61/446,533, filed on Feb. 25, 2011.

(51) Int. Cl.
| | |
|---|---|
| *A61L 2/08* | (2006.01) |
| *A61L 2/00* | (2006.01) |
| *F02C 6/00* | (2006.01) |
| *F01K 1/00* | (2006.01) |
| *F22B 1/28* | (2006.01) |
| *F22G 1/00* | (2006.01) |
| *F23D 14/66* | (2006.01) |

(52) U.S. Cl.
CPC ... *F22B 1/28* (2013.01); *F22G 1/00* (2013.01); *F23D 14/66* (2013.01)

(58) Field of Classification Search
CPC ............. A61L 2/00; A61L 2/07; A61L 9/015; B01B 1/005
USPC .......... 422/1, 26, 298; 60/39.182, 39.49, 659; 405/128.7
See application file for complete search history.

(56) References Cited

U.S. PATENT DOCUMENTS

2007/0145038 A1   6/2007  Reddy et al.
2007/0289285 A1*  12/2007  Jorn ........................... 60/39.182

(Continued)

FOREIGN PATENT DOCUMENTS

| EP | 1781915 B1 | 10/2005 |
| WO | WO9706532 | 7/1996 |
| WO | WO2008061139 | 11/2007 |

OTHER PUBLICATIONS

Adrian Bejan, Advanced Thermodynamics, Third Edition, John Wiley & Sons, p. 282, Aug. 2006.

(Continued)

*Primary Examiner* — Monzer R Chorbaji
(74) *Attorney, Agent, or Firm* — Michael C. Connelly

(57) ABSTRACT

Apparatus and method to produce point-of-use compressed superheated steam for a wide variety of uses including, but not limited to, cleaning, heating, drying, surface preparation, sterilization, pest control and elimination, degreasing and food preparation. The apparatus produces and compresses superheated steam without the hazards and problems associated with the current state of the art where steam is generated, compressed and stored in potentially dangerous and maintenance intensive boilers and associated piping and fixtures. The in-line steam generator of the present application produces superheated steam at one atmosphere which is immediately pressurized using a compression means and then immediately utilized through application employing a nozzle or a storage tank or other such device.

20 Claims, 11 Drawing Sheets

(56) References Cited

U.S. PATENT DOCUMENTS

2010/0061923 A1    3/2010    Reddy
2010/0129157 A1    5/2010    Reddy et al.
2010/0263605 A1    10/2010    Sengar et al.

OTHER PUBLICATIONS

"International Application Serial No. PCT/US12/025334, International Search report and Written Opinion" issued Jul. 25, 2013, 12 pgs.

* cited by examiner

PRESSURIZED POINT-OF-USE SUPERHEATED STEAM GENERATION APPARATUS AND METHOD

CROSS-REFERENCED TO RELATED APPLICATIONS

This application claims the benefit of U.S. provisional application Ser. No. 61/446,533 filed Feb. 25, 2011 and International application PCT/US12/25334 filed Feb. 16 2012 by the present applicants. This application incorporates the apparatus and method disclosed in U.S. patent application Ser. No. 11/682,107 published as US2007/0145038 on Jun. 28, 2007 and Ser. No. 12/514,516 published as US2010/0129157 on May 27, 2010, which are incorporated herein in their entirety by reference.

BACKGROUND

1. Field

The present application relates to the generation of superheated steam at one atmosphere and subsequent pressurization for a wide variety of uses including, but not limited to, cleaning, heating, drying, surface preparation, sterilization, pest control and elimination, degreasing and food preparation.

2. Prior Art

For industrial and non-industrial applications, steam is currently often produced by the heating of water in a boiler or other vessel. Generally, for these applications, saturated steam is produced and is then pressurized to a desired level by the continued application of heat. The pressurized steam generated by this process is then piped from the vessel for use. Saturated steam, having high moisture content, will readily condense in piping and upon application to surfaces. Such systems have several obvious disadvantages including expense, maintenance, efficiency, safety and dimensional constraints.

Common boiler systems can be expensive to install due to the required strength of materials and adequate fabrication needed to meet safety standards. The high temperatures and pressures associated with boilers are very hazardous and need to be compensated for with appropriate engineering design and advanced materials. Required inspection, maintenance, training and insurance costs add to the expense of such systems. Elaborate and expensive piping, gauging and monitoring equipment may also be called for, further adding to the overall expense.

Boiler systems use large amounts of clean water on initial start-up to produce steam. If water is in short supply, operation of such systems would be costly if at all possible. Leaks and condensation in such systems also result in water wastage, corrosion, damage and clean-up. Large amounts of costly and environmentally unfriendly fuel are required to heat the masses of water required in boilers to needed temperatures and pressures. If proper insulation is not installed on piping and other fixtures, which would add to cost, an amount of heat and energy would be lost from the process. For these and other reasons present boiler systems may be very inefficient for their intended purposes. Boiler operators need to be well trained in the operation of their equipment as well as focused, observant and skilled in their duties. Costs and workplace hazards could be minimized with a system that requires less training due to higher safety and easier operation than is the case with current methods for the pressurization of steam.

In many cases, due to their size and weight, current methods of pressurized steam production are limited to industrial or other settings where space is not an issue. In other cases, where space is limited, a boiler system would be too bulky. A smaller, lighter and portable method for providing pressurized steam is needed and is provided for by the present application.

The greatest concern in regards to the generation of pressurized steam is safety. Boilers and other pressure vessels can be extremely dangerous when not designed, built, operated or maintained properly. Pressurized steam lines running from the vessel are hazardous as well. In the vessel, large amounts of very hot pressurized steam are contained in a relatively small volume, creating the possibility of catastrophic rupture and explosion. The failures of steam pressure vessels are common and often deadly. To decrease the chances for such failures, boiler systems must be carefully designed, operated, maintained and inspected, which, as stated above, add to the overall cost of such systems.

SUMMARY

This application presents an apparatus and method for the in-line, point-of-use generation of superheated steam at one atmosphere and the immediate pressurization of the superheated steam. An in-line, point-of use system here is defined as a compact and portable, if desired, system that can quickly, almost as needed, generate superheated steam at one atmosphere and then pressurize the steam to desired levels. The superheated temperature of the steam is maintained during pressurization, which eliminates the disadvantages, associated with the present state of the art. The best mode and other embodiments included in the present application offer a safe, efficient, less costly and portable apparatus and method to supply pressurized superheated steam for a variety of uses.

Described are a point-of-use steam generation and pressurization apparatus and method that solve existing problems associated with current steam pressurization methods which often employ dangerous, maintenance intensive and inefficient boilers and piping. Here, water is quickly and efficiently converted to high temperature steam and then immediately compressed or pressurized with a compressor or other means. The compressed steam may then be contained, projected or otherwise employed for the desired application by the user.

In one embodiment superheated steam is generated at one atmosphere and then compressed utilizing a means of pressurization such as a compressor. In a further embodiment the means of pressurization of the superheated steam is a succession of pressure vessels and check valves that increase steam pressure to desired levels in steps. In all embodiments, the unique properties of superheated steam, such as higher internal energy, higher enthalpy, higher specific volume and higher temperatures attainable at lower pressures, are relied upon to produce a novel and improved and apparatus and method for the safe and economic application of superheated steam for many industrial and non-industrial uses.

Figure 1:
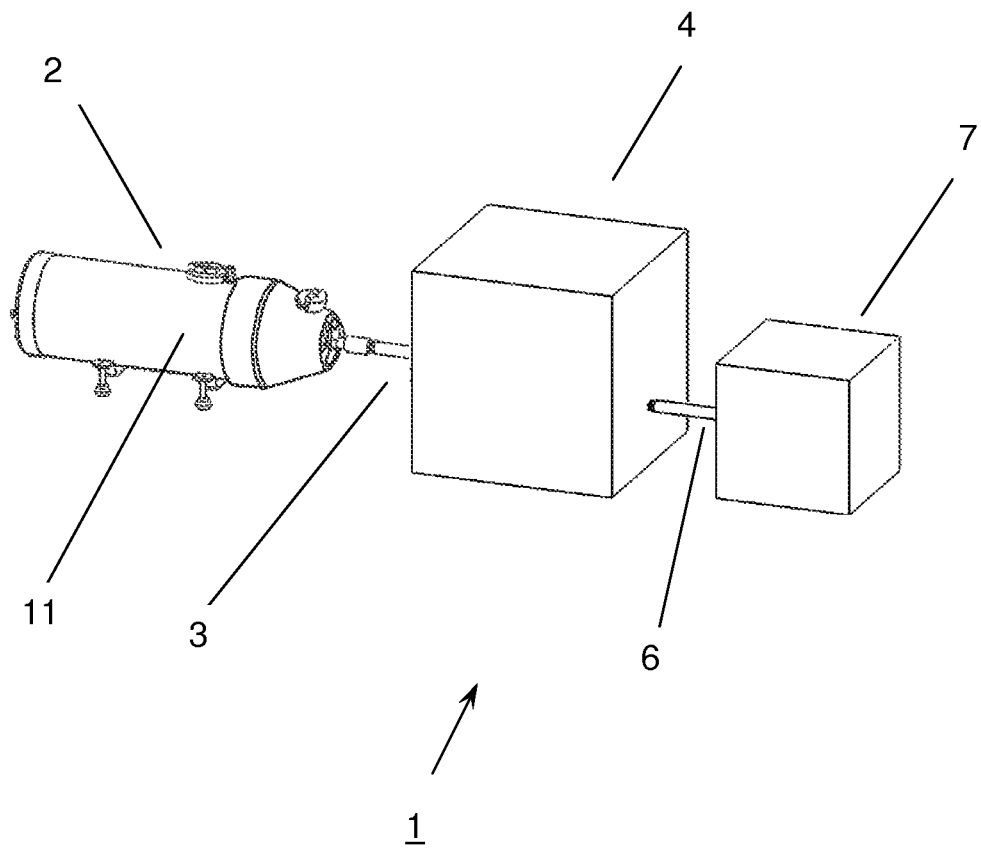
FIG. 1 is a perspective view of the pressurized point-of-use superheated steam generation apparatus showing a superheated steam assembly, composed of a superheated steam generator inside a housing, connected to a means of pressurization which, in turn, is connected to a means of application.

| DRAWINGS-Reference Numerals | | | |
|---|---|---|---|
| 1. | pressurized superheated steamer | 2. | superheated steam assembly |
| 3. | low-pressure piping | 4. | means of pressurization |
| 5. | piston-type compressor | 6. | high-pressure piping |
| 7. | means of application | 8. | hose and nozzle assembly |
| 9. | pressure vessel | 9-1. | P1 pressure vessel |
| 9-2. | P2 pressure vessel | 9-3. | Pn pressure vessel |
| 10. | industrial gas heater | 11. | steam generator housing |
| 12. | cylindrical tubular housing | 13. | one-way check valve |
| 13a. | one atmosphere one-way valve | 13-1. | P1 one-way valve |
| 13-2. | P2 one-way valve | 13-3. | Application control valve |
| 14. | gas entry port | 16. | gas exit port |
| 18. | open end | 20. | end cap |
| 22. | annular sidewall | 24. | end wall |
| 26. | stepped passage | 28. | inner helical coil |
| 28a. | generally continuous wire | 28b. | gap |
| 28c. | adjacent turn | 28d. | terminal lead wire |
| 28e. | flow path | 28f. | bare wire cross section |
| 30. | outer helical coil | 30a. | generally continuous wire |
| 30b. | gap | 30c. | adjacent turn |
| 30d. | terminal lead wire | 30e. | flow path |
| 30f. | bare wire cross section | 34. | spacer |
| 200. | superheated steam generator | 202. | gas inlet source |
| 204. | power cord grip | 206. | gas inlet |
| 208. | manifold housing | 210. | casing |
| 212. | delivery tube | 214. | end plate |
| 216. | fluid reservoir | 218. | feed line |
| 220. | needle valve | 222. | reactor vessel |
| 224. | porous medium | 226. | exit nozzle |
| 228. | diffuser | 300. | superheated steam generator |
| 302. | pump | 304. | fluid reservoir |
| 305. | valving | 306. | outer jacket housing |
| 308. | chamber | 310. | inlet |
| 312. | conduit | 314. | outlet |
| 400. | pressurized superheated steamer | 450. | external heater |

DETAILED DESCRIPTION

Presented is a new apparatus and method for the point-of-use generation at one atmosphere of superheated steam and its subsequent pressurization for a variety of applications. Such apparatus and method as described here are safer, more versatile, more efficient and less costly than the current technology which often utilizes boilers for the pressurization of steam. Steam generated in any manner may be compressed and pressurized as described in this application, but specific embodiments will be discussed in greater detail.

Figure 4:
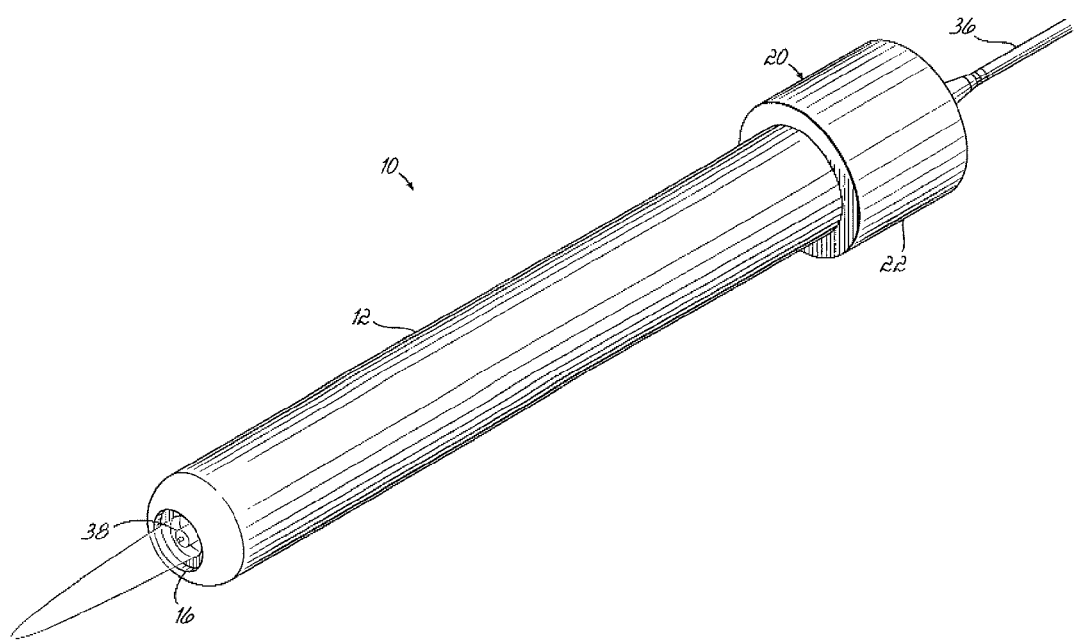
FIG. 4 is an embodiment of the heater contained within the superheated steam generator of the present application.
Figure 8:
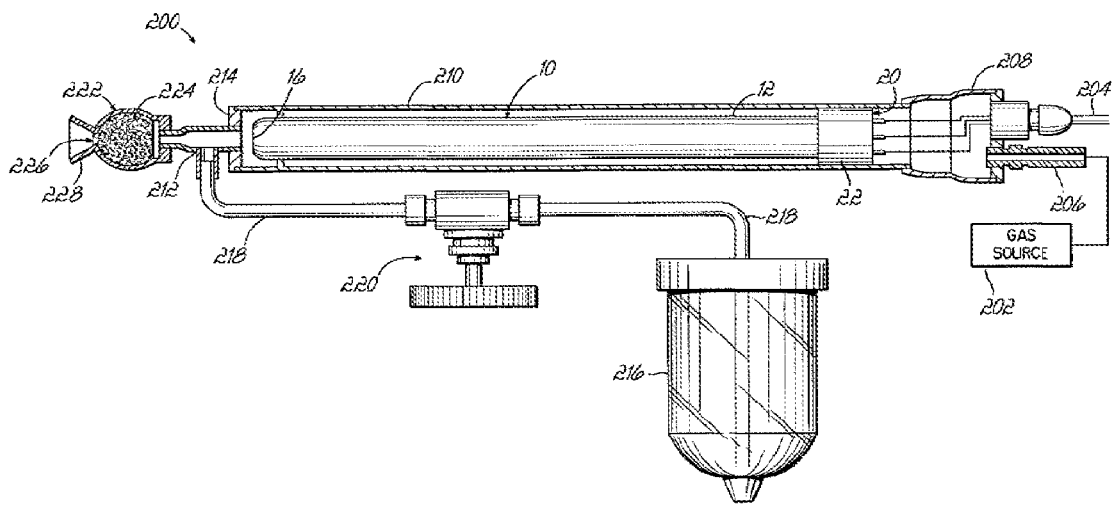
FIG. 8 is an embodiment of the superheated steam generator utilized in the present application.
Figure 9:
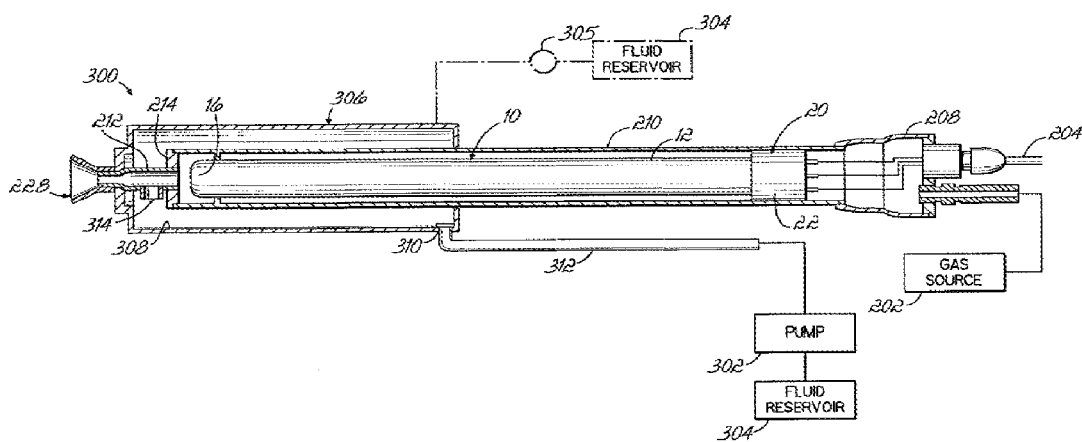
FIG. 9 is a further embodiment of the superheated steam generator utilized in the present application.

Superheated steam generators of the type, for example, produced by MHI-Inc. with patents pending and published internationally as WO2008/061139 A2 and in the United States national phase as US2010/0129157 A1 are envisioned as the means for the production of superheated steam at one atmosphere in this application. Such generators rely on a flow of gas through and across electrically heated coils contained within the body of the generator. The gas is intended to exit the gas exit port at temperatures between 500° C. and 1500° C. and at a rate in the range of about 1 cubic foot per minute (CFM) to about 1000 CFM. The generators typically have, as depicted in FIGS. 4, 8 and 9, tubular housings which contain the heating coils and through which the gas passes.

Figure 10:
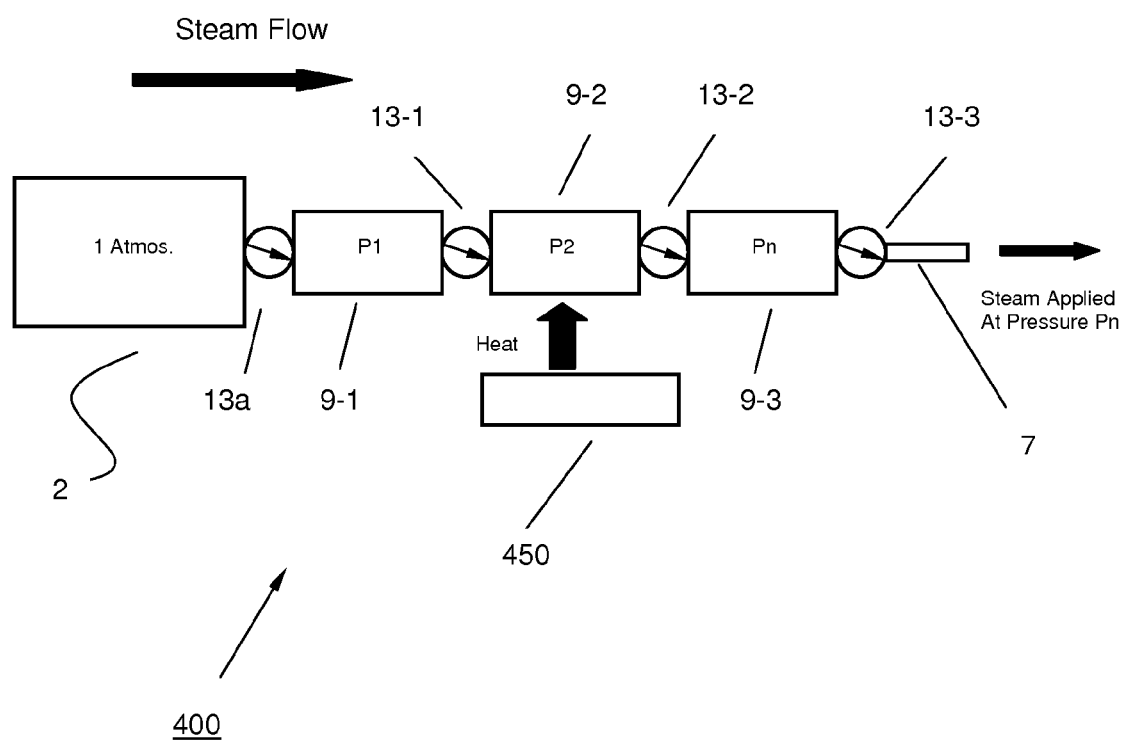
FIG. 10 is a schematic of an embodiment of a pressurized superheated steam apparatus wherein superheated steam pressure is increased to desired levels through the employment of a succession of pressure vessels and check valves.

The generation of steam can be accomplished by the introduction of water, or possibly other fluids, to the heated gas flow, which commonly is air. The water is almost instantaneously converted to superheated steam and then mixed with the gas flow. The introduction of the water and the mixing of the water vapor with the gas flow may take place outside of the exit port (FIG. 8) or within the tubular enclosure of the generator (FIG. 9). After the water is converted to super heated steam and mixed within the gas flow it is then compressed by use of a compressor or other means of pressurization. Superheated steam may also be compressed by the use of a series of pressure vessels and one-check valves which together increase the pressure to desired levels (FIG. 10).

In part, the unique characteristics of superheated steam allow the improvements over the prior art to be realized in the present application. Superheated steam is drier than standard steam allowing for use in applications were condensation is problematical. Steam traps to collect condensation are not needed with superheated steam systems as they are with current systems that use saturated steam. With superheated steam being dry, condensation and resulting corrosion are less of a concern when superheated steam is generated and piped and contained or when it is applied to surfaces. Superheated steam can reach higher temperatures at lower pressures than normal steam (See FIG. 13) and superheated steam has higher internal energy and enthalpy than normal steam. Due to the above characteristics, the superheated steam produced by the embodiments presented in the present application can be used for sanitizing, surface cleaning, sterilizing, antimicrobial applications, and various other uses from heat treatment to drying.

Superheated steam is different than saturated steam as it is decoupled from, and does not follow, the $P_{sat}$ (saturated pressure)/$T_{sat}$ (saturated temperature) curve that saturated steam follows. It is well known in the art that even when labeled "saturated", the steam (gas) may hold water vapor (See: Advanced Thermodynamics, Third Edition, Adrian Bejan, John Wiley & Sons, pg. 282). This wet vapor could be, for example, condensed water droplets. In some applications, such as sterilizing, these condensed droplets can defeat the intended use. When water is phase separated into saturated steam, following FIG. 13, water droplets may still be present by phase separation/spinodal-like behavior. The line of FIG. 13 acts more like a band rather than a line, allowing for droplets of water to be mixed within the steam. The higher temperatures of superheated steam allow it to contain less moisture and not condense at pressures lower than saturated steam. Superheated steam is in a vapor region and not a liquid vapor region that saturated steam is found in and is therefore drier, containing less moisture, than saturated steam. Thus, less corrosion and other damage associated with wet conditions will occur in connection with the apparatus equipment or to the items to which the superheated steam is applied.

Figure 13:
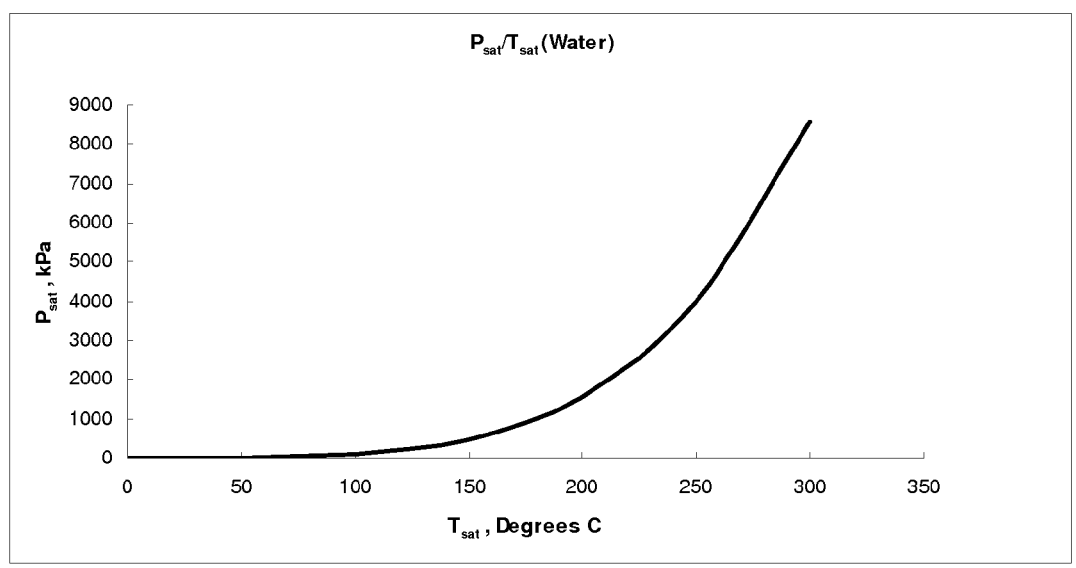
FIG. 13 is a plot showing the behavior of superheated steam in reference to $P_{sat}$ and $T_{sat}$.

FIG. 13 shows the relationship between saturation pressure and saturation temperature for saturated steam. The plot indicates at what temperature saturated steam is generated at an existing pressure. For example, at one atmosphere (around 100 kPa) saturated stem can be generated at 100° C. Superheated steam, however, exists below and to the right of the saturated steam curve, meaning that at one atmosphere, superheated steam can reach temperature well in excess of 100° C. These facts indicate that superheated steam can reach high temperatures without pressurization which suggests safer and more energy efficient apparatuses and procedures of high temperature steam generation and application.

It has been determined through experiment at MHI that superheated steam produced by the novel technology represented by FIGS. 4-9 can be compressed by a pump or other means of pressurization while retaining a superheated temperature. The superheated steam generator presented in US2007/0145038 and US2010/0129157 and shown in FIGS. 8 and 9, in general, consists of an industrial gas heater having a tubular enclosure with a gas entry port spaced from a gas exit port. The industrial gas heater, in various embodiments, includes an inner helical coil contained within the tubular enclosure and an outer helical coil also contained with in the tubular enclosure and surrounding the inner coil to define a substantially unobstructed annular space between the coils. Each coil is electrically heated to convectively heat a gas entering the tubular enclosure via the gas entry port, passing through the annular space between the coils and exiting the tubular enclosure via the gas exit port.

In various other embodiments the inner and outer coils are each right circular helical coils arranged concentrically. The inner and outer coils may be wound in opposite directions from each other or in the same direction. The individual coils may be formed from a generally continuous bare wire concentrically wound into a right circular helical coil. The inner and outer coils may be formed together of one generally continuous bare wire, thereby constituting a single electric circuit in series. In other embodiments the inner and outer coils may have different configurations from each other. A spacer may be positioned within the tubular enclosure proximate to the gas exit port and adjacent distal ends of the inner and outer coils to minimize deformation of the coils.

The tubular enclosure may be a housing in the form of a right circular cylinder having an open end proximate to the gas entry part and an end cap closing the open end of the housing. In various embodiments the outer coil is positioned in close proximity to, or in contact with, an inner surface of the tubular enclosure to minimize gas flow between the outer coil and the inner surface of the tubular enclosure and to maximize heat transfer to the gas. The coils are designed to heat the gas flowing through the annular space and exiting the gas exit port to a temperature in the range of 500° C. to 1500° C. and at a rate in the range of about 1 cubic foot per minute (CFM) to about 1000 CFM.

An embodiment of this industrial heater allows the apparatus to be a superheated steam generator. In this embodiment, the heater, as described above, includes a fluid reservoir adapted to contain a working fluid, a mixing device in fluid communication with the fluid reservoir and the heater and a reactor vessel in fluid communication with the mixing device to receive a fluid and heated gas mixture to produce superheated steam exiting the reactor vessel. The mixing device may be a venturi mixing apparatus. The heater heats a gas to a temperature above the saturation temperature of water such that when the water is combined with the heated gas, a mixture of superheated steam and gas is produced. The generation of the superheated steam-gas mixture is done at approximately one atmosphere of pressure. The temperature of the superheated steam-gas mixture may be between the saturation temperature of water at about one atmosphere of pressure (e.g., about 100° C.) and 1500° C.

FIG. 8 shows water being introduced to the heated gas flow at the exit port of the heater. FIG. 9 shows an alternate embodiment where water is introduced in a sleeve around the heater which keeps the water from direct contact from the heater or gas flow while still allowing it to be in thermal communication therewith. A further embodiment anticipates the introduction of water though a rear entrance port without the need for a separate gas input into the housing of the heater, where the water would be instantly converted to superheated steam. The introduction of other fluids, in place of water, is anticipated as well. Gasses other than air to be heated by the heating unit are also anticipated.

Figure 2:
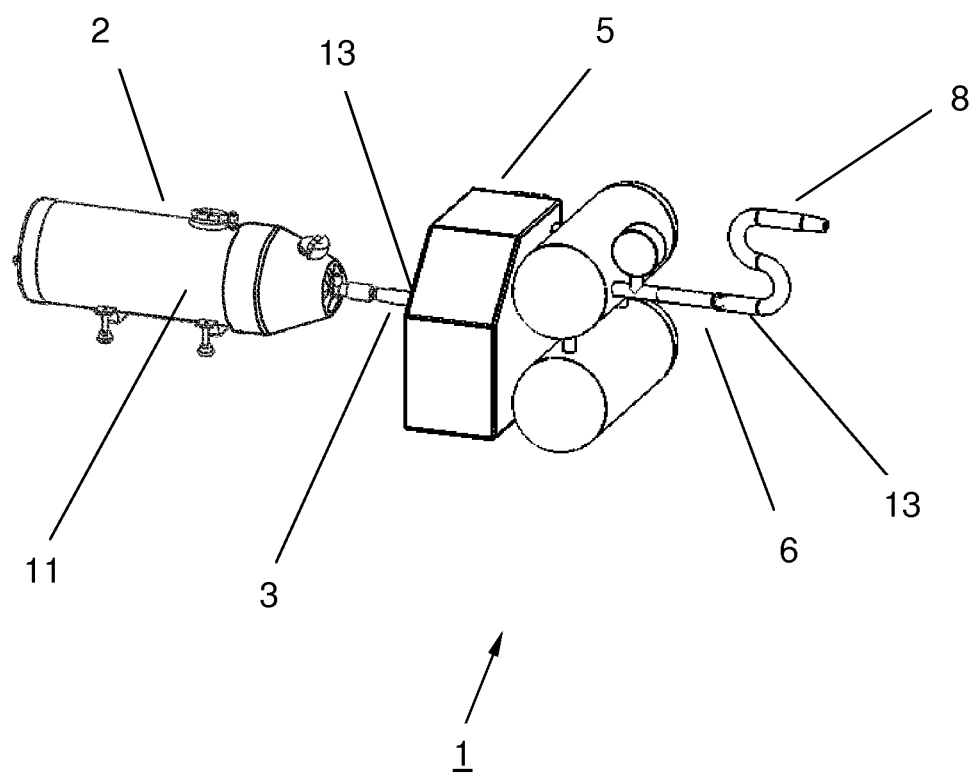
FIG. 2 is a perspective view of the pressurized point-of-use superheated steam generation apparatus depicting the means of pressurization as a compressor and the means of application as a hose and nozzle.
Figure 3:
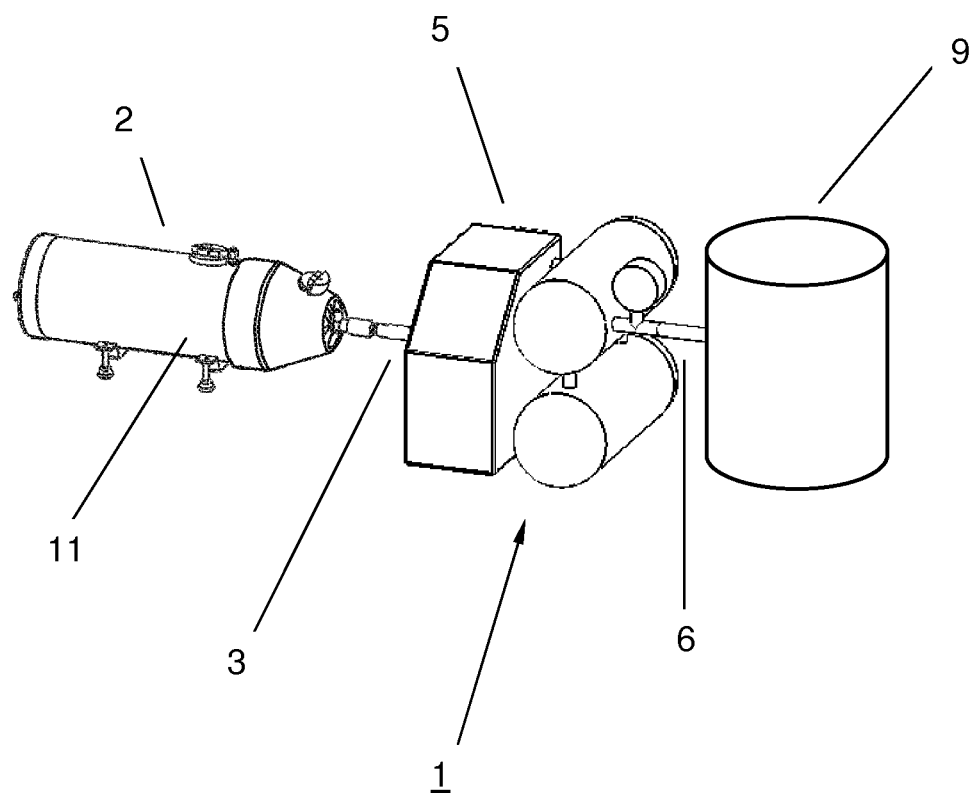
FIG. 3 is a perspective view of the pressurized point-of-use superheated steam generation apparatus depicting the means of pressurization as a compressor and the means of application as a pressure vessel.

The resulting high pressure superheated steam would then be applied for a variety of uses including, but not limited to, killing of micro-organisms, sterilization, surface preparation, decontamination, cleaning and degreasing. Multiple delivery means are envisioned for the application of the pressurized steam. The steam could be applied directly to desired workpieces through the use of hoses and nozzles (FIG. 2). The pressurized steam could also be piped into a closed container or pressure vessel for sterilizing, preparation or decontamination of objects and surfaces (FIG. 3). The pressurization will allow the superheated steam to penetrate more deeply and completely both general and hard-to-reach surfaces and features. The high temperature of the superheated steam will be able to destroy a wide variety of bacteria and other micro-organisms and also permit the treatment and preparation of surfaces where higher temperatures are required, but are not provided for by the present state of the art.

The system described has great utility and is very adaptable for a variety of uses. Its size is scalable and portable and in-place embodiments are anticipated. Smaller steam generation and pressurization units are envisioned as being able to be transported to where needed, while larger units could be installed permanently in place in an industrial setting. Wherever the application may be, there will be no need for expensive and space-taking piping and fixturing. A portable unit could be plugged in to any convenient electrical outlet and operated. Larger units could be hard-wired into a power source. Great flexibility is thus provided which, in turn, reduces expenses.

FIGS. 1-3 show an apparatus for in-line point-of-use superheated steam generation and pressurization 1. FIG. 1 depicts an apparatus for in-line point-of-use superheated steam generation at one atmosphere and subsequent pressurization featuring a superheated steam assembly 2, consisting of a superheated steam generator 200 or 300 held within a steam generator housing 11, attached to a means of pressurization 4 which is coupled to a means of applying 7 the pressurized superheated steam. The superheated steam assembly 2 produces superheated steam at one atmosphere that immediately flows through low-pressure piping 3 to the means of pressurization 4. The superheated steam is pressurized by the means of pressurization and can then be passed through piping 6 to a means of application 7 and projected on to a work-piece. When necessary, a one-way check valve 13 may be positioned at the junction of the low pressure piping 4 and the means of pressurization 3 to prevent the flow of high pressure steam back into the superheated steam generator 200 or 300. Likewise, a one-way check valve 13 may be positioned at the junction of the piping 6 and the means of application 7 to prevent flow-back into the means of pressurization 4.

In one embodiment, presented in FIG. 2, the means of pressurization is a piston-type compressor 5 with the means of application being a hose and nozzle assembly 8. FIG. 3 shows another embodiment where the means of application is a pressure vessel 9 in which objects are placed to be treated with the compressed superheated steam. In all embodiments the steam is superheated at one atmosphere. Superheated steam is dryer than other forms of steam resulting in less condensation on various components in the system such as piping and compressors. Superheated steam is different than saturated steam as it is decoupled from and does not follow the $P_{sat}$ (saturated pressure)/$T_{sat}$ (saturated temperature) curve that saturated steam follows. The higher temperatures of superheated steam allow it to contain less moisture and not condense at pressures lower than saturated steam. Superheated steam is in a vapor region and not a liquid vapor region that saturated steam is found in and is therefore drier, containing less moisture, than saturated steam. Thus, less oxidation and other damage associated with wet conditions will occur in connection with the apparatus equipment or to the items to which the, compressed and applied quickly with no boilers and little piping.

Figure 5:
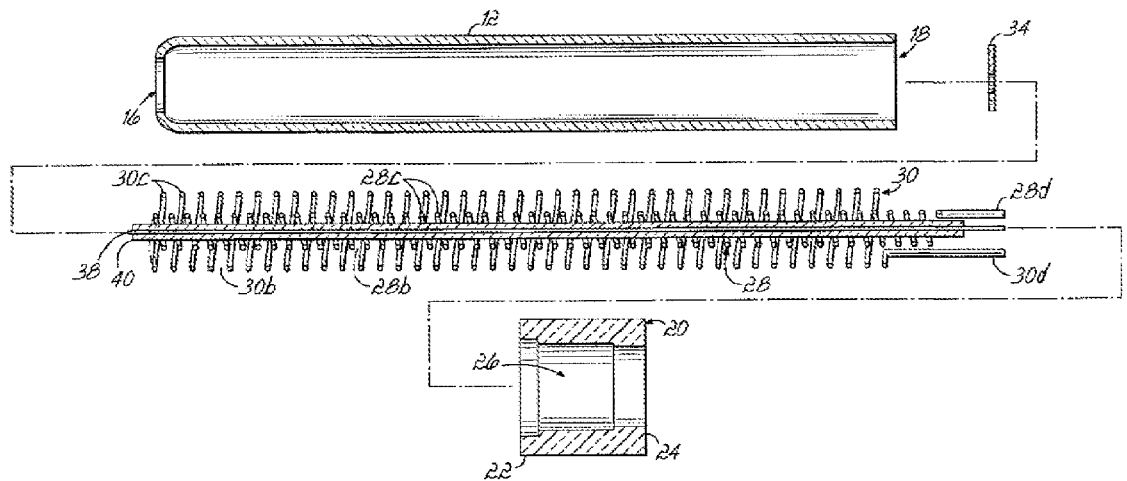
FIG. 5 is an exploded view of the heater contained within the superheated steam generator.
Figure 6:
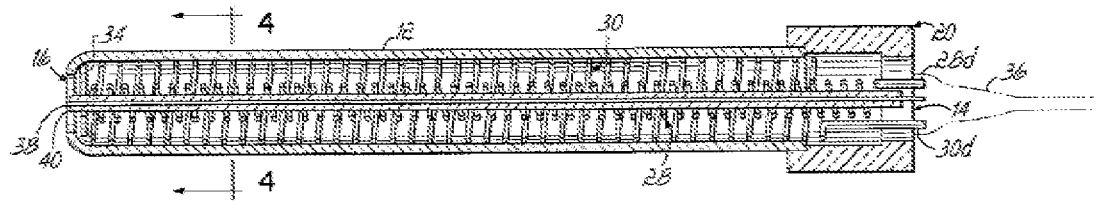
FIG. 6 is a cross sectional view of the heater contained within the superheated steam generator.

Referring to FIGS. 4-6, an exemplary embodiment of an industrial gas heater 10 according to this invention is shown. The heater 10 includes a generally right circular cylindrical tubular housing 12 having a gas entry port 14 at a first end of the housing 12 spaced from a gas exit port 16 at an opposite end of the housing 14. The housing 14 may be an monolithic ceramic tube or other material such as a metallic enclosure. However, we have found that the temperature of the gas heated within the assembly is increased anywhere from 25-200° C. when a ceramic housing is utilized.

The gas entry port 14 is proximate to an open end 18 of the housing 14 and is selectively closed by an end cap 20 mounted on the open end 18 of the housing 14. The end cap 20 may be made from a ceramic of approximately 90 percent aluminum oxide. The cap 20 includes an annular sidewall 22 and an end wall 24. The end cap 20 is a partially open end cap and according to various embodiments of this invention, the end cap 20 can be fully or partially open with additional openings for electrical feed-throughs and thermocouple feed-throughs. A stepped passage 26 is formed on the interior of the sidewall 22 and the gas entry port 14 is on the end wall 24. The opening diameter of the gas entry port 14 to the gas exit port 16 may be at a ratio of about 2:1.

The gas heater 10 includes an inner helical coil 28 and an outer helical coil 30 contained within the tubular housing 12. The inner and outer coils 28, 30 are coaxially aligned and concentrically arranged as right circular helical coils within the housing 12 to define a substantially unobstructed annular space 32 for passage of gas through the housing 12 from the gas entry port 14 to the gas exit port 16. In one embodiment, each coil 28, 30 is formed from a generally continuous wire 28a, 30a, respectively, concentrically wound into right circular helical coils. A diameter of the wire 28a, 30a for each coil may range from about 0.1 mm to about 6 mm A gap 28b, 30b between the adjacent turns 28c, 30c of each coil 28, 30 may range from about 0.01 mm to about 85 mm. The gap or pitch of each coil 28, may increase adjacent to the entry port 14 and terminal lead wires 28d, 30d.

We have found that where the outer coil 30 is in close proximity to and/or in contact with the inside face of the tubular housing 12, the gas processed in the heater is heated approximately 25° to 200° C. higher than if the outer coil 30 is not in such a configuration relative to the housing 12. Additionally, a spacer 34 which may be ceramic is positioned at the distal end of the coils 28, 30 proximate the gas exit port 16. The spacer 34 increases the useful life of the coils 28, 30 and minimizes coil deformation over extended periods of use.

Figure 7:
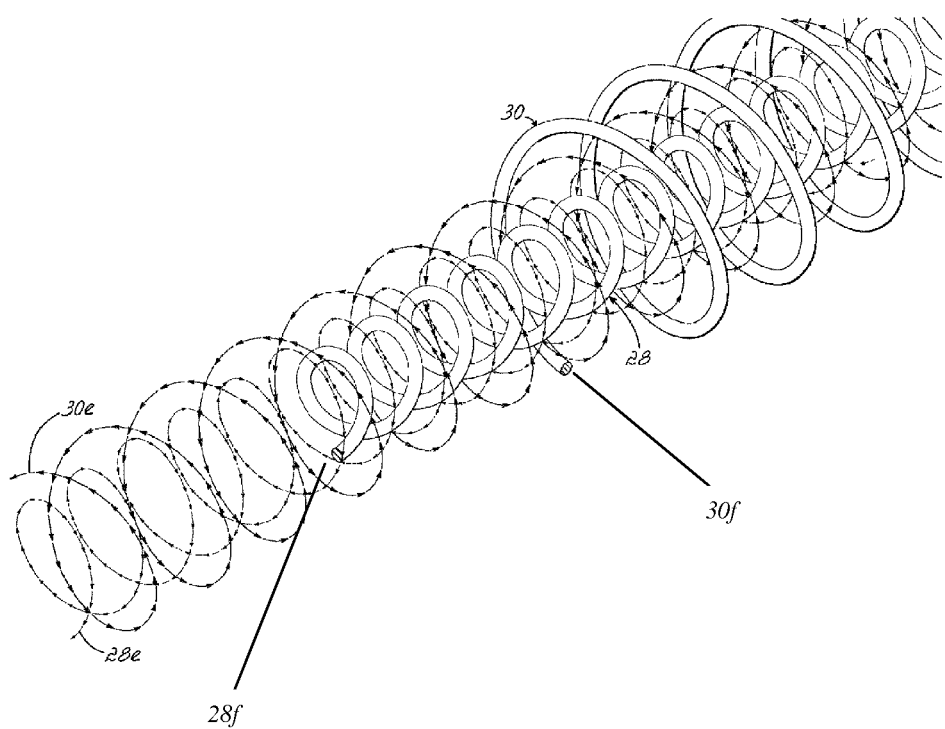
FIG. 7 is a view of the heating coils contained within the heater.

Among the advantages provided by a gas heater 10 according to this invention is the increased contact between the gas flowing from the entry port 14 to the exit port 16 with the coils 28, 30. For example, the coils 28, 30 may be similarly wound or wound in opposite directions as shown in FIG. 7. Gas flowing through the housing 12 passes between the coils 28 and 30. Additionally, gas flowing between the adjacent turns 28c, 30c of the respective coils 28, 30 flows in a riffling or spiraling configuration as schematically shown in FIG. 7 with flow paths 28e and 30e. The wire of the coils 28 and 30 are composed of bare wire which can be defined otherwise as having a solid or monolithic cross section or as being unclad or having no coating or insulation. Such composition is illustrated by wire cross sections 28f and 30f in FIG. 7. The bare wire of the coils 28 and 30 is generally continuous forming one circuit operating in series. The coils 28 and 30 are wound in a round configuration as opposed to an oval or non-round shape found in the prior art. With the windings of the respective coils 28, 30 being in opposite direction, increased mixing of the gas with the coils 28, 30 is provided to obtain a more turbulent gas flow. This arrangement provides for increased thermal transfer from the heated coils 28, 30 to the gas relative to prior art industrial gas heating systems.

The range of gap spacing between the adjacent turns 28c, 30c of the wires 28a, 30a in the coils 28, 30 is between about 35 mm and about 85 mm with the presently preferred being about 40 mm for the inner coil 28 and about 65 mm for the outer coil 30.

A further embodiment of an industrial heater 10 according to this invention is shown in FIG. 8 and is adapted to generate super heated steam. Traditionally, boiling water at high pressure and then heating the steam at high pressure have produced super heated steam. The embodiment of FIG. 8 provides a device where the flow of hot air over an orifice causes a super saturated steam jet. Components of the industrial heater and steam generator 200 shown in FIG. 8 that are the same or similar to corresponding components of the heater 10 as shown in FIGS. 4-6 are labeled in a similar manner. The words "superheated", "supersaturated" and variations thereof are interchangeable. Superheated steam for the purposes of this specification is steam at less than 100° C. at 1 atmosphere or at high pressures greater than 1 atmosphere. It also encompasses $H_2O$ in the form of gas at any temperature. Although we use the word steam to illustrate making $H_2O$ gas or vapor we anticipate with this word any embodiment for the conversion of any fluid to a gaseous state with our apparatus and method. The word supersaturated steam is used to indicate $H_2O$ or other materials in the form of gas at temperatures above 100° C. at pressures of about 1 atmosphere and/or higher. By supersaturated steam we also infer $H_2O$ in the form of vapor. One objective of this invention is to make supersaturated steam at 1 atmosphere; whereas, it normally takes high pressure to make supersaturated steam. Although we use the word steam to illustrate making $H_2O$ gas or vapor we anticipate with this word any embodiment for the conversion of any fluid to a gaseous state with our apparatus and method. We also intend to use the words superheated and supersaturated interchangeably.

The superheated steam generator 200 includes a gas inlet source 202, which may be pressurized or unpressurized, and a power cord grip 204 proximate a gas inlet 206 of the device. A manifold housing 208 is mounted on the gas entry end of a casing 210 that is generally a right circular tube. An industrial gas heater 10 according to a variety of embodiments according to this invention such as those shown in FIGS. 4-6 is mounted within the casing 210.

Proximate the gas exit port 16 of the industrial gas heater 10, a delivery tube 212 is mounted to an end plate 214 of the casing 210. The delivery tube 212 is in communication with a fluid reservoir or cup 216 which may be a polycarbonate reservoir. The delivery tube 212 advantageously includes a venturi assembly therein. A supply or feed line 218 from the reservoir 216 is regulated by a needle valve 220, the operation of which is well known by those of ordinary skill in the art. The valve 220 may be either mechanical, electromechanical, semiconductor, nano valve, needle valve, self regulation condition by water level or any other commonly understood regulating device with or without feedback. The feed line 218 is coupled to the delivery tube 212 as shown in FIG. 8. The supply feed line 218 may be stainless steel piping or other appropriate material. The delivery tube 212 feeds into a reactor vessel 222 having a generally bulbous configuration. Contained within the reactor vessel 222 is a porous medium 224 such as steel wool or other generally non-dissolvable media; however, a dissolvable media may be utilized within the reactor vessel 222, if appropriate. The porous medium 224 may be made of metallic, ceramic, polymer, intermetallic, nano-materials, or composite materials or combinations and mixtures thereof. The porosity may be reticulated or well defined. The porosity may be even or uneven and may vary from nanometer-size to centimeter sized pores. An exit nozzle 226 is provided on the reactor vessel 222 and may include a diffuser 228.

The liquid to be heated into super saturated steam is contained within the reservoir 216 and fed to the venturi tube through the inlet pipe as regulated by the needle valve. The gas heated by the gas heater passes into the delivery or venturi tube 212 that is connected to the liquid reservoir 216. As the hot gas passes through the venturi tube 212, it draws the liquid from the reservoir 216. The liquid flow as previously stated is controlled by the needle valve 220. The liquid is atomized in the venturi tube 212 and the liquid/gas mixture enters the reactor vessel 222 where the liquid is vaporized. The unique design of the reactor vessel 222 provides for total vaporization of the liquid. The vaporized fluid exiting the reactor vessel 222 may be re-circulated through the superheated steam generator 200 and introduced into the gas inlet 202. Furthermore, the apparatus and method of this invention may produce steam by the addition of $H_2O$ through one or both of the coils in the gas heater 10. This introduction of the $H_2O$ may be at the inlet, outlet or in-between the gas passage and the $H_2O$ may be added in the form of a liquid, gas or mist.

We have noted that the position of the valve 220 influences the air steam mixture. For example, at 100 ml of water in 462 seconds, a high 40% specific humidity value at 375° C. at about 1.3 cfm of hot air is generated. The relative humidity is estimated to be about 40% at this temperature assuming full compositional scale ideal gas mixing with no mixing enthalpy. Further, at 375° C., a pressure of 22 MPa (i.e., approximately 220 times atmospheric pressure) is needed to initiate condensation of the mixture. Alternatively, cooling the gas to about 110° C. at one atmosphere may be required to initiate condensation on account of high surface energy. Thus, under cooling and nucleation may be problems that are overcome by the use of superheated steam presented in this application. Specific humidity is defined as the mass of $H_2O$ divided by the mass of air.

Steam temperature depends on the water valve 220 setting and air inflow setting. Typical settings at a full power of 1 kW for the gas heater to are as follows: gas at 1.45 CFM and water at 200 ml in 45 minutes yields steam air temperature of approximately 350° C. Gas at 1.4 CFM and water at 200 ml in 20 minutes yields steam air temperature of about 250° C. Further, gas at 1.8 CFM and water at 200 ml in 20 minutes yield steam air temperature of about 150° C. The above examples utilize a gas inlet temperature at approximately 30° C. and the water inlet temperature at approximately 30° C.

A superheated steam generator 300 in accordance with another embodiment of the invention is illustrated in FIG. 9. The superheated steam generator 300 is similar to the superheated steam generator 200, and thus only the differences between the two will be described in detail. Similar reference numerals will refer to similar features as shown in FIG. 8. In this embodiment, the use of a venturi to draw the working fluid from fluid reservoir 216, and the use of the reactor vessel 222 may be eliminated. Instead, and in one embodiment, a pump 302 may be used to actively supply the working fluid to the superheated steam generator 300 from a fluid reservoir 304. For example, the pump 302 may be a peristaltic pump having the necessary controls for selectively metering the flow rate of the working fluid (e.g., water) to the superheated steam generator 300. Such peristaltic pumps are commercially available. Other arrangements for supplying the working fluid to the superheated steam generator 300 are also within the scope of the invention. By way of example, a passive arrangement (shown in phantom in FIG. 9) may be utilized wherein the fluid reservoir 304 (e.g., water bag, cartridge, etc.) supplies the working fluid to the heater and steam generator 300 through gravity, for example, or other passive means. In such an embodiment, the reservoir 304 may include appropriate valving 305 (e.g., drip chambers, clips, etc.) for metering the flow of the working fluid to the superheated steam generator 300. Another modification to superheated steam generator 300 is the inclusion of an outer jacket housing 306 that defines a chamber 308 about at least a portion of the casing 210 having an inlet 310 for receiving the working fluid from pump 302 via a suitable conduit 312, and an outlet 314 in fluid communication with delivery tube 212. While the outer jacket housing 306 is shown adjacent the outlet side of the superheated steam generator 300, the housing 306 may be located along other portions of the heater and steam generator.

In operation, the pump 302 or other active or passive supply device supplies the working fluid from the reservoir 304 through conduit 312, through inlet 310, and into the chamber 308 defined by housing 306. The heater 10 heats the casing 210 sufficiently to preheat the working fluid contained in chamber 308 to near or at its saturation temperature (e.g., boiling point). Thus, saturated liquid, saturated vapor or both may be present in chamber 308. Similar to the previous embodiment, the fluid in chamber 308 then flows into the delivery tube 212 where it mixes with the heated gas exiting gas heater 10. The heat from the gas causes the working fluid introduced from chamber 308 to become superheated. In one embodiment, the working fluid is water and the superheated steam generator 300 generates superheated steam. Other working fluids, however, may be used in accordance with aspects of the invention as mentioned above. The end of the delivery tube 212 may include a threaded portion for coupling to various exit nozzles 228 that facilitate directing the superheated vapor-gas mixture (e.g., steam-air mixture) toward various items 230.

FIG. 10 describes an alternative embodiment of the pressurized point-of-use superheated steamer 400 of the present application. The means of pressurization for this embodiment comprises a series of steps, with each step comprising a pressure vessel and a one-way valve, rather than an apparatus such as a compressor. The generation of superheated steam, and the kinetic energy contained therein, are used themselves to increase the pressure of the superheated steam to desired levels for application. This embodiment comprises a superheated steam assembly 2 and a series of pressure vessels 9 and one-way check valves 13 that step-by-step build up the pressure of the steam. A water supply (not pictured) supplies water or other liquids directly to the superheated steam generator 200 or 300 found in the superheated steam assembly 2 for this and all other embodiments. Also, for all embodiments it is envisioned that the superheated steam generator 200 or 300 may be employed without being contained within a steam generator housing 11.

Figure 11:
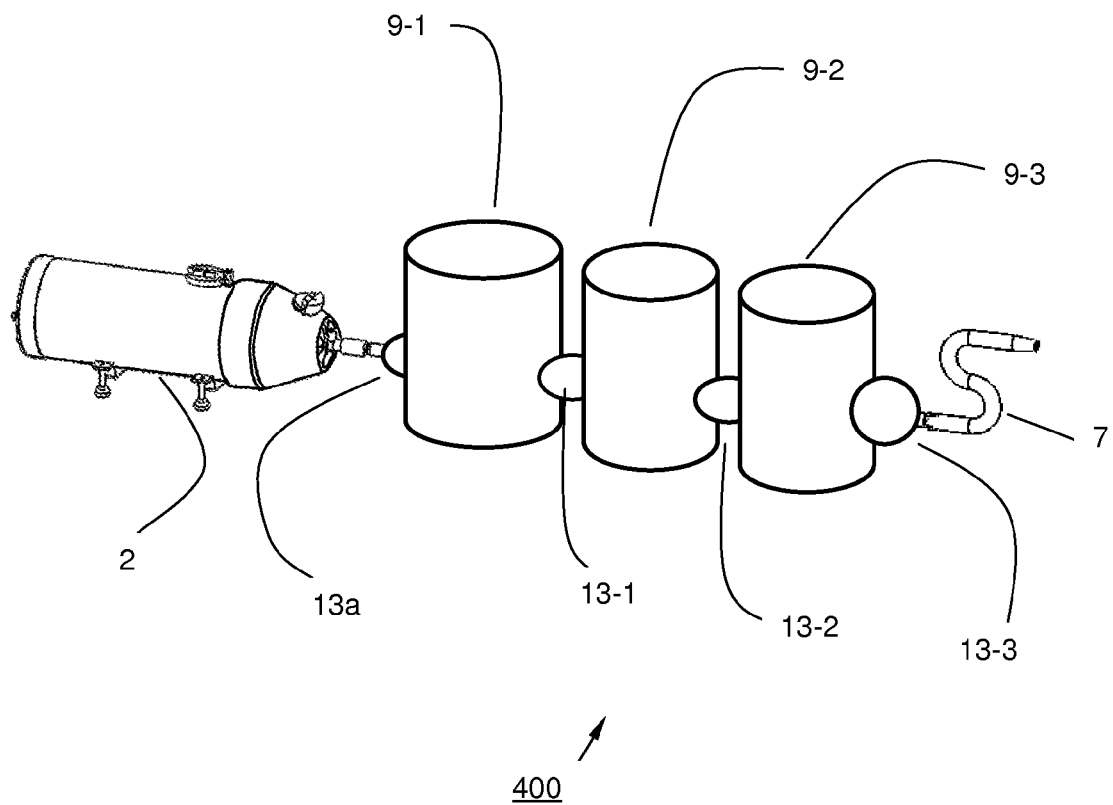
FIG. 11 is an embodiment of a pressurized superheated steam apparatus wherein superheated steam pressure is increased to desired levels through the employment of a succession of pressure vessels and check valves.
Figure 12:
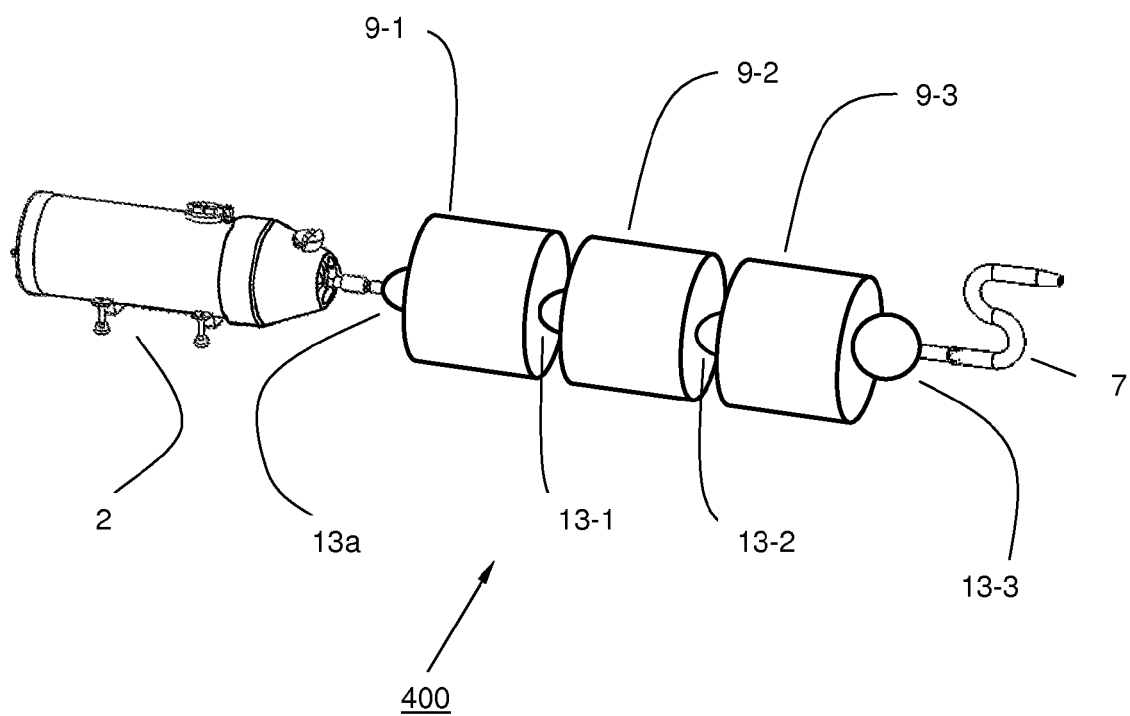
FIG. 12 is a further embodiment of a pressurized superheated steam apparatus wherein superheated steam pressure is increased to desired levels through the employment of a succession of pressure vessels and check valves.

The embodiments of FIGS. 10-12 comprise a superheated steam assembly 2, which generates steam at one atmosphere, connected to a one atmosphere one-way valve 13a which in turn is connected to a P1 pressure vessel 9-1 designed to contain a pressure P1 which is greater than one atmosphere. The P1 pressure vessel 9-1 is connected to a P1 one-way valve 13-1 that is connected to a P2 pressure vessel 9-2 which is designed to contain a pressure of P2, which is greater than P1. The P2 pressure vessel 9-2 is then connected to a P2 one-way valve 13-2 which in turn is connected to a Pn pressure vessel 9-3 with the pressure Pn being greater than P2. Vessel 9-3 terminates in an application control valve 13-3 and is the last of the pressure vessels, and holds the greatest pressure in the series of vessels and valves. Each pressure vessel and the following one-way check valve represent a step in a series designed to incrementally increase the pressure of superheated steam using the heat and kinetic energy of the superheated steam itself.

In this application, a pressure above 1 atmosphere is represented by the letter P. The number following P indicates a level of pressure, with a higher number indicating a higher pressure and the highest pressure being represented by the lower case letter n (Ex.: P1, P2, P3 . . . Pn, where P1 is the lowest pressure and Pn is the highest).

Each of the one-way valves acts as a check valve allowing a specific lower pressure from upstream to enter a pressure vessel but preventing higher pressure located downstream from flowing back into a lower pressure chamber. For example, superheated steam generated by the superheated steam assembly 2 would be permitted to enter the P1 pressure vessel 9-1 through valve 13a. However, the valve 13a would prevent P1 pressure steam in vessel 9-1 from flowing back into the superheated steam assembly 2. Steam in vessel 9-1 could flow through valve 13-1 only when the steam reaches a pressure of P2 and valve 13-1 allows it to pass. This process is repeated for each successive step-up in pressure as the steam passes through the series of one-way valves and pressure vessels until a desired steam pressure is reached and the steam is applied.

A means of application 7 is connected to the application control valve 13-3, with such valve permitting the steam to flow to the means of application 7, allowing for the application of superheated steam. The means of application may be a hose and nozzle assembly 8 or a pressure vessel 9, but is not to be limited by these examples. An external heat supply 450 may be optionally used with any or all of the pressure vessels to maintain or increase the temperature of the superheated steam if needed. It is anticipated that more or fewer pressure vessels and one-way check valves may be used, depending on the level of pressure that is desired. It is also anticipated that the pressure vessels and one-way check valves may be in any increment needed for the specific application. It is further anticipated that the superheated steam may be generated by the superheated steam generators 200 or 300 which utilize the coil-in-coil industrial gas heater 10 described in the present application, but not limited to generation by them. Other means to generate superheated steam are thereby anticipated as well.

In operation this embodiment 400 works as follows: One atmosphere superheated steam is generated by a superheated steam assembly 2. The one atmosphere superheated steam contains high internal energies, including kinetic energy which moves the one atmosphere steam through the one atmosphere one-way valve 13a and into the P1 atmosphere pressure vessel 9-1. As more one atmosphere steam enters the vessel 9-1 the pressure in it increases until it reaches a pressure of P1. The P1 steam seeks an exit, and since the valve 13a prevents the steam from flowing back through it upstream, the superheated steam exits through the P1 one-way valve 13-1 and enters the P2 pressure vessel 9-2. As before, superheated steam accumulates in the vessel 9-2 until a pressure of Pn is reached. When Pn is attained the steam passes through valve 13-2 into the Pn pressure vessel 9-3 where, in turn, the superheated steam accumulates at the final pressure of Pn. After accumulating to a usable amount at pressure Pn, the Pn one-way valve allows the superheated steam to be released to a means of application 7 and directed to desired surfaces and objects. It is also envisioned that the superheated steam could be released and applied immediately from vessel 9-3 at pressure Pn via a means of application 7 rather than allowing the steam to accumulate in vessel 9-3. Likewise, vessel 9-3 could act as the pressure vessel 9 used as a means of application in which items are placed for superheated steam treatment. Such an apparatus and process may be used with more or fewer one-way valves and pressure vessels or one-way valves and pressure vessels rated at lower or higher pressures. The step-ups in pressure could therefore be fewer or greater and could have different incremental values depending on the needs of the application.

During this process the superheated steam assembly 2 is generating and providing to the series of valves and vessels a constant flow of superheated steam that allows the steam to accumulate in the various pressure vessels and build up to the desired pressures. If, during this process, external heat is needed to keep the superheated steam at desired temperatures an optional external heat supply 450 may be used at any location in the series of pressure vessels. The step-up in pressure can be accomplished under the $P_{sat}/T_{sat}$ curve. This would represent a savings in power necessary to attain desired pressures.

As with previous embodiments, this embodiment is safer, more efficient and more economical than the prior art Minimal piping is required between the superheated steam generator, pressure vessels, valves and means of application requiring less maintenance. The materials and design need only be sufficient for safety at particular stages for particular pressures. An expensive high pressure system need not be fabricated for the entire apparatus. A safer method of pressurizing steam is provided due to constant pressure relief through the valves and an initial generation of superheated steam at one atmosphere. Less water and power is needed making the apparatus more economical and efficient. Such a device also takes up less space and could be portable. Ease of use would require less training for operators as well.

Other features are contemplated with all embodiments described in the application and may be added when needed. These features include, but are not limited to pressure relief valves, pressure gauges or sensors, drains, integral water source, integral power source, power cut-off switch, water supply piping, heat shielding and insulation. Also, the embodiments will be able to use different combinations of fluids (not only water) to produce superheated and pressurized vapor.

Also, it is anticipated that with all embodiments various assemblies and parts of these assemblies such as pressure vessels, means of pressurization, air compressors and parts including piston rings, valves, piping and means of application could be coated or comprised of antimicrobial and/or enhanced emissivity materials or nanostructures when desired. Such materials are described in U.S. patent application Ser. Nos. 12/516,183 and 12/092,923, which are both incorporated by reference in their entireties, wherein the materials are composed of nanoparticles which comprise at least one of: silver, tungsten, iron, carbon, aluminum, copper, nickel, iron, SiC, $SiO_2$, an oxide of at least one of nickel, iron, tungsten, or chromium, Cu, Ag, Au, Pt, Pd, Ir, a rare earth metal, a semiconductor, B, Si, Ge, As, La, Sb, Te, Po, an iron oxide, a tungsten oxide, a chromium oxide, $V_2O_5$, $Fe_2O_3$, FeOx, $Fe_3O_4$, aluminum oxide, NiO, zinc oxide, tin oxide, hafnium carbide, tungsten carbide, $MnO_2$, $SiO_2$, $MoO_3$, $HfO_2$, $WO_3$, $TiB_2$, $CrO_3$, $Nb_2O_5$, $Al_2Zr$, $B_4C$, $SiO_x$, $ZrSiO4$, $B_2O_3$, CdS, MnS, $MoS_2$, $MoSi_2$, $MoSi_x$, $NaN_3$, NaCN, $Si_2N_4$, $Si_3N_4$, PbO, $PbO_2$, $WO_2$, $BaO_2$, $SiO_2$, $NiFe_yO_x$, $MoS_x$, $Fe_zNO_x$, and a further defect compound, where x, y, and z represent non-integer values, or at least one of an oxide, a carbide, a nitride, an aluminide, a boride, a silicide, or a halide of at least one of Cu, Ag, Au, Fe, Si, Ti, Hf, Pt, Pd, or Ir. Coatings of these materials could reduce the antimicrobial levels in the water used and the steam produced reducing the possibility of corrosion and bacterial, biofilm and other undesirable microbial growth. The emissivity of the pressure vessels could be improved by a coating of the materials described in Ser. No. 12/092,923 allowing them to be heated externally with greater efficiency.

The above descriptions provide examples of specifics of possible embodiments of the pressurized point-of-use superheated steam generation apparatus and should not be used to limit the scope of all possible embodiments. Thus the scope of the embodiments should not be limited by the examples and descriptions give, but should be determined from the claims and their legal equivalents.

We claim:

1. An apparatus for the point-of-use generation at one atmosphere of superheated steam and subsequent pressurization of said superheated steam comprising;
    a one-atmosphere superheated steam generator, and
    a means to pressurize said superheated steam connected to said superheated steam generator.

2. The apparatus of claim 1 wherein said steam generator comprises:
    a housing,
    at least one electrically heated coil for the heating of gas contained within said housing, and
    a fluid supply means for direct provision of fluid to the hot gas for conversion to steam.

3. The apparatus of claim 2 wherein said electrically heated coil is composed of a continuous bare wire.

4. The apparatus of claim 1 further comprising a means to direct and apply said compressed steam to surfaces and locations.

5. The apparatus of claim 4 wherein the one-atmosphere superheated steam generator, the means to pressurize said superheated steam and the means to direct and apply said compressed steam are coated with an antimicrobial coating.

6. The apparatus of claim 5 wherein the antimicrobial coating is comprised of nanoparticles.

7. The apparatus of claim 6 wherein the nanoparticles are comprised of at least one of: silver, tungsten, iron, carbon, aluminum, copper, nickel, iron, SiC, $SiO_2$, an oxide of at least one of nickel, iron, tungsten, or chromium, Cu, Ag, Au, Pt, Pd, Ir, a rare earth metal, a semiconductor, B, Si, Ge, As, La, Sb, Te, Po, an iron oxide, a tungsten oxide, a chromium oxide, $V_2O_5$, $Fe_2O_3$, FeOx, $Fe_3O_4$, aluminum oxide, NiO, zinc oxide, tin oxide, hafnium carbide, tungsten carbide, $MnO_2$, $SiO_2$, $MoO_3$, $HfO_2$, $WO_3$, $TiB_2$, $CrO_3$, $Nb_2O_5$, $Al_2Zr$, $B_4C$, $SiO_x$, $ZrSiO4$, $B_2O_3$, CdS, MnS, $MoS_2$, $MoSi_2$, $MoSi_x$, $NaN_3$, NaCN, $Si_2N_4$, $Si_3N_4$, PbO, $PbO_2$, $WO_2$, $BaO_2$, $SiO_2$, $NiFe_yO_x$, $MoS_x$, $Fe_zNO_x$, and a further defect compound, where x, y, and z represent non-integer values, or at least one of an oxide, a carbide, a nitride, an aluminide, a boride, a silicide, or a halide of at least one of Cu, Ag, Au, Fe, Si, Ti, Hf, Pt, Pd, or Ir.

8. The apparatus of claim 1 wherein said means to pressurize said steam comprises an air compressor.

9. The apparatus of claim 1 wherein the means to pressurize superheated steam comprises,
    a one-atmosphere one-way valve connected to the superheated steam generator in a manner that allows steam generated by the steam generator at one atmosphere to flow through the one-atmosphere one-way valve, and
    a series of steps, each of the steps comprising a pressure vessel and one further one-way valve connected to the one-atmosphere one-way valve in a manner which allows steam to flow from the one-atmosphere one-way valve into the series of the pressure vessels and the further one-way valves so that steam pressure is built up to a greater level in the steps.

10. The apparatus of claim 9 further comprising a means of application connected to the further one-way valve.

11. The apparatus of claim 9 wherein said steam generator comprises:
    a housing,
    at least one electrically heated coil for the heating of gas contained within said housing, and
    a fluid supply means for direct provision of fluid to the hot gas for conversion to steam.

12. The apparatus of claim 9 further comprising an external heat source positioned to heat the pressure vessel found in any of the series of steps.

13. A method for point-of-use generation at one atmosphere of superheated steam and subsequent pressurization of said superheated steam comprising;
    generating the point-of-use of superheated steam at one-atmosphere and pressurizing said steam.

14. The method of claim 13 further comprising directing and applying pressurized steam to surfaces and locations.

15. The method of claim 13 wherein the steam is generated by a steam generator comprising a housing, at least one electrically heated coil for the heating of gas contained within said housing and a fluid supply means for direct provision of fluid to the hot gas for conversion to steam then pressurized in a means of compression comprised of an air compressor.

16. The method of claim 13 wherein the conversion of the fluid to the hot gas occurs inside of said housing.

17. The method of claim 13 wherein the conversion of the fluid to the hot gas occurs external to said housing.

18. A method for point-of-use generation at one atmosphere of superheated steam and subsequent and pressurization of said superheated steam comprising;
  generating steam at one atmosphere,
  superheating the steam at one atmosphere, and
  flowing the steam that has been superheated at one atmosphere through a series of steps, each step comprising a pressure vessel and a one-way valve that incrementally increase the pressure of the steam to a desired level.

19. The method of claim 18 further comprising applying external heat to the pressure vessel of any of the series of steps.

20. The method of claim 18 wherein the generation and superheating of steam is
  accomplished utilizing a steam generator comprising,
  a housing,
  at least one electrically heated coil for the heating of gas contained within said housing wherein said electrically heated coil is composed of a continuous bare wire, and
  a fluid supply means for direct provision of fluid to the hot gas for conversion to steam.

\* \* \* \* \*